(12) United States Patent
Rusconi Clerici Beltrami et al.

(10) Patent No.: US 12,466,722 B2
(45) Date of Patent: Nov. 11, 2025

(54) MEMS SOUND TRANSDUCER WITH A DAMPING LAYER MADE OF ADHESIVE

(71) Applicant: USound GmbH, Graz (AT)

(72) Inventors: Andrea Rusconi Clerici Beltrami, Vienna (AT); Ferruccio Bottoni, Graz (AT)

(73) Assignee: USOUND GMBH, Graz (AT)

( * ) Notice: Subject to any disclaimer, the term of this patent is extended or adjusted under 35 U.S.C. 154(b) by 488 days.

(21) Appl. No.: 18/073,879

(22) Filed: Dec. 2, 2022

(65) Prior Publication Data

US 2023/0174369 A1 Jun. 8, 2023

(30) Foreign Application Priority Data

Dec. 3, 2021 (DE) .................... 10 2021 131 976.5
Dec. 15, 2021 (DE) .................... 10 2021 133 329.6

(51) Int. Cl.
  *B81B 3/00* (2006.01)
(52) U.S. Cl.
  CPC .... *B81B 3/0021* (2013.01); *B81B 2201/0257* (2013.01); *B81B 2203/0118* (2013.01); *B81B 2203/0127* (2013.01); *B81B 2203/0163* (2013.01); *B81B 2203/0315* (2013.01)
(58) Field of Classification Search
  CPC ................ H04R 19/005; H04R 31/006; H04R 2201/003; H04R 2307/00; B81B 2201/0257; B81B 2203/0127; B81B 2203/0118; B81B 2203/0163; B81B 2203/0315
  See application file for complete search history.

(56) References Cited

U.S. PATENT DOCUMENTS

| 10,045,136 B2 | 8/2018 | Clerici Beltrami et al. |
| 2010/0224437 A1* | 9/2010 | Booth .................... H04R 17/00 181/166 |
| 2017/0325030 A1* | 11/2017 | Stoppel .................. H04R 17/00 |
| 2018/0237290 A1* | 8/2018 | Haug .................... B81B 7/0016 |
| 2019/0241428 A1 | 8/2019 | Mitchell et al. |

(Continued)

FOREIGN PATENT DOCUMENTS

| DE | 69602102 T2 | 9/1999 |
| DE | 102007010711 A1 | 9/2008 |

(Continued)

OTHER PUBLICATIONS

The German Search Report with English translation for DE application No. 102021131976.5., 9 pages.

(Continued)

*Primary Examiner* — Moazzam Hossain
(74) *Attorney, Agent, or Firm* — Dority & Manning, P.A.

(57) ABSTRACT

A transducer unit for a MEMS sound transducer includes a support, a transducer element connected to the support and deflectable along a reciprocation axis, a coupling element for connecting the transducer element to a diaphragm in a manner spaced apart from the transducer element, and a spring region formed between the transducer element and the coupling element, the spring region including at least one spring element, which movably connects the transducer element to the coupling element, and which includes a damping layer, which at least partially covers the spring element.

15 Claims, 4 Drawing Sheets

(56) References Cited

U.S. PATENT DOCUMENTS

2020/0351595 A1* 11/2020 Rusconi Clerici Beltrami ...........
H04R 17/00
2021/0195339 A1* 6/2021 Palmer .................... H04R 7/18

FOREIGN PATENT DOCUMENTS

| DE | 102015107560 A1 | 11/2016 |
| DE | 1020151114242 A1 | 3/2017 |
| DE | 102017202605 A1 | 8/2018 |

OTHER PUBLICATIONS

The European Search Report for EP application No. 22210982.9., Mar. 28, 2023, 7 pages.

* cited by examiner

MEMS SOUND TRANSDUCER WITH A DAMPING LAYER MADE OF ADHESIVE

FIELD OF THE INVENTION

The present invention relates to a transducer unit for a MEMS sound transducer, the transducer unit including a support, at least one transducer element, which is connected to the support and is deflectable along a reciprocation axis, a coupling element for connecting the transducer element to a diaphragm spaced apart from the transducer element and movable along the reciprocation axis, and a spring region formed between the transducer element and the coupling element, the spring region including at least one spring element, which movably connects the transducer element to the coupling element, and including a damping layer, which at least partially covers the spring element, the invention is further relating to a MEMS sound transducer and to a manufacturing method for such a transducer unit and/or such a MEMS sound transducer.

BACKGROUND OF THE INVENTION

DE 10 2015 114 242 A1, which corresponds to applicant's commonly owned U.S. Pat. No. 10,045,136, which is hereby incorporated herein in its entirety by this reference for all purposes, describes a MEMS sound transducer that includes an actuator and a diaphragm, which are spaced apart from each other in the direction of a reciprocation axis and are indirectly connected to each other via a reciprocation structure. The actuator is connected to the reciprocation structure via a flexible connecting element. The flexible connecting element must be highly filigreed in order to be able to ensure an optimal movement of the reciprocation structure and of the actuator. It is disadvantageous that the flexible connecting element can break during mechanical vibrations, for example, when the MEMS loudspeaker falls onto the floor. This results, in turn, in the failure of the MEMS loudspeaker.

OBJECTS AND SUMMARY OF THE INVENTION

The object of the present invention is to eliminate the disadvantages known from the related art, in particular to create a MEMS sound transducer that is more robust against mechanical vibrations, and/or a manufacturing method, with which the manufacturing costs for the manufacture of the MEMS sound transducer can be reduced.

The object is achieved by means of a transducer unit, a MEMS sound transducer, and/or a manufacturing method having one or more of the features described below.

The invention relates to a transducer unit for a MEMS sound transducer, which includes a support. Furthermore, the transducer unit includes at least one transducer element, which is connected to the support and is deflectable along a reciprocation axis. The transducer unit preferably includes multiple transducer elements. The transducer unit also includes a coupling element for connecting the at least one transducer element to a diaphragm spaced apart from the transducer element. The coupling element is movable along the reciprocation axis. Moreover, the transducer unit has a spring region, which includes at least one spring element and is formed between the transducer element and the coupling element. The spring element movably connects the transducer element to the coupling element. The transducer unit also includes a damping layer, which at least partially covers the spring element. The damping layer reduces the amount of vibration, i.e., the maximum induced elongation as well as the duration of the loading that acts on the spring element during a mechanical shock. As a result, a breakage of the at least one spring element can be prevented. Moreover, the damping layer is formed from a cured adhesive. As a result, the damping layer can be very cost-effectively formed, as the result of which the manufacturing costs of the transducer unit can be reduced. Moreover, the material properties of the damping layer can be selected regardless of the material properties of the transducer element. Advantageously, the material properties of the damping layer can therefore be selected in such a way that the damping layer adversely affects the mobility of the spring element as little as possible and, simultaneously, protects the spring element against external mechanical interference effects in the best way possible.

It is advantageous when the cured adhesive is elastic, is flexible, and/or has an elasticity modulus of less than 10 MPa. As a result, it can be ensured that the mobility of the spring element and, accordingly, also the mobility of the transducer element are essentially not adversely affected.

Moreover, it is advantageous when the cured adhesive is thixotropic, and so its viscosity decreases during continuous deformation. Advantageously, the damping layer protects the spring element very well when the transducer unit is not operating. Moreover, the mobility of the spring element and of the transducer element during the operation of the transducer unit is increased and improved.

It is advantageous when the cured adhesive has a density of 0.5 g/cm$^3$ to 1.5 g/cm$^3$, in particular 1.09 g/cm$^3$.

It is also advantageous when the cured adhesive is an epoxy resin. In order to avoid damage being done to the spring element, it is advantageous when the adhesive is solventless.

In order to be able to ensure a mobility of the spring element that is as good as possible, it is advantageous when the spring region includes at least one continuous recess.

Moreover, it is advantageous when the damping layer at least partially covers and/or spans the at least one recess. The term "cover" and/or "span" is to be understood to mean that the damping layer essentially does not extend into the recess. Consequently, the adhesive forming the damping layer has not run into the recess, or has run into the recess only in an input region, during the manufacture.

It is also advantageous when the recess extends in the direction of the reciprocation axis from a first side of the spring region, which, during use as intended, preferably faces away from the diaphragm provided therefor, up to an opposite, second side of the spring region, which, during use as intended, preferably faces the diaphragm provided therefor.

It is also advantageous when the recess extends from the transducer element up to the coupling element in the longitudinal direction of the transducer element.

It is also advantageous when the recess cuts free one longitudinal side of the spring element. As a result, the mobility of the spring element can be improved.

It is also advantageous when the damping layer is arranged on the first and/or the second side of the spring region.

It is also advantageous when the recess has a recess opening at the first and/or the second side of the spring region in the direction of the reciprocation axis. It is also advantageous when the damping layer is arranged, in particular only, in the region of the recess opening in the direction of the reciprocation axis, and so an inner region of the recess adjoining the recess opening is preferably adhesive-free.

It is also advantageous when the at least one recess, in particular in a top view, includes a first section, which is formed between two opposite spring element sections of the same spring element. Furthermore, it is advantageous when the at least one recess, preferably in a top view, includes a second section, which is formed between the spring element and the transducer element. It is advantageous when the at least one recess, in a top view, includes a third section, which is formed between the spring element and the coupling element. Moreover, it is advantageous when the at least one recess, in a top view, includes a fourth section, which is formed between two adjacent spring elements.

It is also advantageous when the recess, in particular the first, the second, the third, and/or the fourth section(s), has a width that is designed corresponding to a viscosity of the liquid adhesive in such a way that the liquid adhesive does not drip through the recess. Preferably, the recess, in particular the first, the second, the third, and/or the fourth section(s), has a width of 5 μm to 40 μm, in particular of 30 μm.

Moreover, it is advantageous when the at least one spring element, in the top view, is arranged between two recesses.

It is also advantageous when the damping layer at least partially covers an end face of the coupling element adjoining the spring region. As a result, the complexity of the manufacture of the damping layer and, therefore, the costs of the transducer unit are reduced.

It is advantageous when the transducer element is formed as a cantilever arm. Furthermore, it is advantageous when the transducer element has a base, which is fixedly connected to the support, and/or a free end, which is deflectable with respect to the support along the reciprocation axis. It is advantageous when the free end is higher than the spring region in the direction of the reciprocation axis, and so a shoulder is formed between these two, against which the damping layer rests.

It is also advantageous when the transducer unit has a multilayer structure, which includes at least one support layer and/or one piezoelectric transducer layer.

Furthermore, it is advantageous when the support layer is an integral part of the transducer element, of the at least one spring element, and/or of the coupling element.

It is also advantageous when the transducer layer at least partially forms the shoulder.

The invention also relates to a MEMS sound transducer for generating and/or detecting sound waves, including a diaphragm, which is deflectable along a reciprocation axis, and including a transducer unit. The transducer unit includes a support and a transducer element, which is connected to the support, is spaced apart from the diaphragm, and is deflectable along the reciprocation axis. The transducer unit also includes a coupling element, which connects the transducer element to the spaced-apart diaphragm and is movable together with the diaphragm along the reciprocation axis. Furthermore, the transducer unit includes at least one spring region formed between the transducer element and the coupling element, the spring region including at least one spring element, which movably connects the transducer element to the coupling element. The spring region has a damping layer, which at least partially covers at least the spring element, for the protection of the spring element. The transducer unit is designed according to the preceding description, wherein the aforementioned features can be present individually or in any combination.

The invention also relates to a manufacturing method for a transducer unit and/or a MEMS sound transducer, in particular according to the preceding description, wherein the aforementioned features can be present individually or in any combination. In the manufacturing method, a damping layer is formed in a spring region of the transducer unit on at least one spring element. A liquid adhesive is applied into the spring region, the liquid adhesive at least partially covering the spring element. Thereafter, the adhesive is cured, and so the damping layer is formed from the cured adhesive.

It is advantageous when the liquid adhesive is applied in the spring region as a drop or a line. This is preferably carried out using an application device, in particular a needle.

It is advantageous when the liquid adhesive has a viscosity of 5000 mPa*s to 15000 mPa*s, in particular of 10000 mPa*s. As a result, it can be ensured that the liquid adhesive does not drip through the at least one recess formed in the spring region. Moreover, the liquid adhesive having the aforementioned viscosity can be applied quickly and in a targeted manner. It is also ensured, as a result, that the liquid adhesive can liquefy and/or uniformly spread out in the region in which the damping layer is to be formed.

In order to reduce the duration of the manufacture of the transducer unit and/or of the MEMS sound transducer, it is advantageous when the adhesive is cured by means of, i.e., under supply of, light, in particular UV and/or VIS, and/or heat.

It is also advantageous when the liquid adhesive is irradiated with an irradiation intensity of more than 100 mW/cm$^3$, in particular of 150 mW/cm$^3$, for curing. In this regard, it is advantageous when the liquid adhesive is irradiated for less than 60 s, in particular 30 s, for curing.

It is also advantageous when the liquid adhesive is cured at a temperature, in particular an ambient temperature, of more than 100° C., preferably at more than 130° C., particularly preferably at more than 150° C. In this regard, it is advantageous when the liquid adhesive is exposed to the temperature for less than 15 minutes, preferably less than 11 minutes, particularly preferably less than 6 minutes.

It is also advantageous when the adhesive shrinks during the curing by 1 percent by volume to 3 percent by volume, in particular by 2 percent by volume.

It is also advantageous when a semi-finished product of the transducer unit and/or of the MEMS sound transducer, in particular at least the spring region, is manufactured in an etching process and that the liquid adhesive is applied after the etching process.

BRIEF DESCRIPTION OF THE DRAWINGS

Further advantages of the invention are described in the following exemplary embodiments, wherein.

DETAILED DESCRIPTION OF EXEMPLARY EMBODIMENTS

Figure 1:
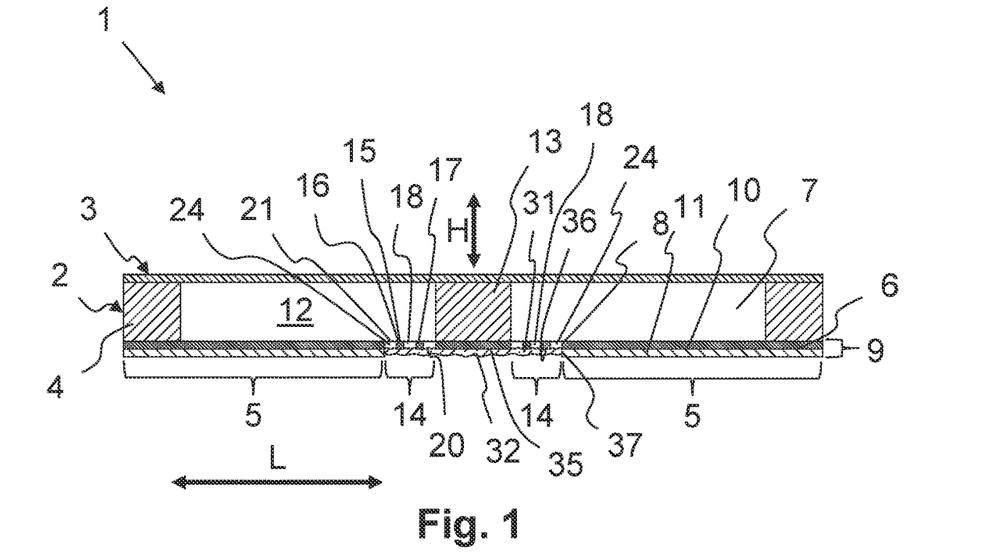
FIG. 1 shows a lateral sectional view of a schematically represented MEMS sound transducer taken in the direction of the arrows A-A in FIG. 2.
Figure 2:
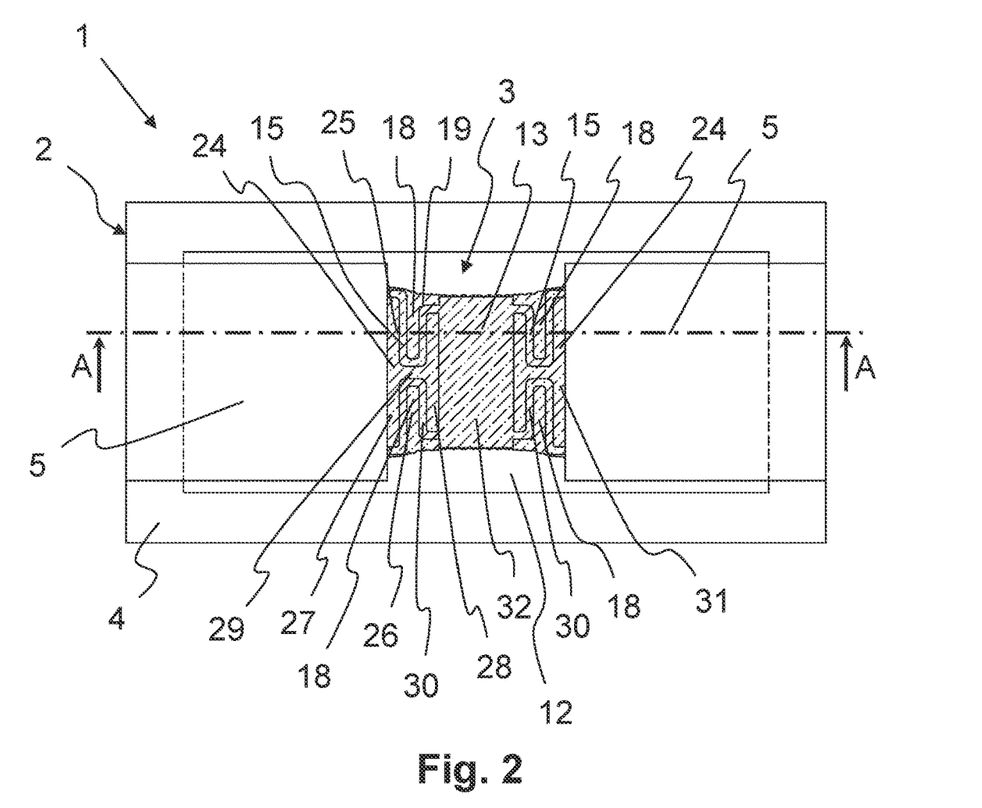
FIG. 2 shows a top view of the MEMS sound transducer shown in a cross-sectional view in FIG. 1.

FIGS. 1 and 2 show a MEMS sound transducer 1 for generating and/or detecting sound waves. Accordingly, the MEMS sound transducer 1 can be used for generating and/or detecting sound waves in the audible wavelength spectrum. Additionally or alternatively, the MEMS sound transducer 1 can also generate and/or detect sound waves in the ultrasonic range, however. Due to the compact design of the MEMS sound transducer 1, the MEMS sound transducer 1 is particularly well suited for use in mobile devices, such as, for example, cell phones, audio glasses, headphones, and/or hearing aids.

The MEMS sound transducer 1 includes a transducer unit 2, with which movements can be converted into electrical signals. In this case, the transducer unit 2 functions as a microphone, a sensor, or a data receiver. Additionally or alternatively, the transducer unit can generate movements from electrical signals. In this case, the transducer unit 2 functions as a loudspeaker, an actuator, or a data transmitter. In the present exemplary embodiment, the MEMS sound transducer 1 also includes a diaphragm 3, which is coupled to the transducer unit 2. The diaphragm 3 is deflectable along a reciprocation axis that is designated by the double-headed arrow H in FIG. 1. The diaphragm 3 is preferably made of an elastic material.

The transducer unit 2 includes a support 4 and at least one transducer element 5. The transducer element 5 is connected to the support 4. As is apparent from FIG. 1, the transducer element 5 is arranged at a first side face of the support 4. The diaphragm 3 is mounted, in its edge area, at an opposite, second side face of the support 4. The diaphragm 3 can include a reinforcing element (not shown here), which is spaced apart from the edge area.

In the present exemplary embodiment, the transducer element 5 is formed as a cantilever arm. Consequently, the transducer element 5 includes a base 6, which is the region of the transducer element 5 fixedly connected to the support 4. Starting from this base 6, the transducer element 5 extends in the direction designated by the double-headed arrow L in FIG. 1 and extends in that direction beyond the support 4 into a cavity 7 of the MEMS sound transducer 1. The term "cavity" refers to an acoustic hollow space or an acoustic volume on the back side of the diaphragm 3. The transducer element 5 has a free end 8, which is shown in an enlarged view in FIG. 3. This free end 8 is formed at an end of the cantilever arm positioned opposite the base 6. While the base 6 is anchored to the support 4 and thus cannot move relative to the support 4, the free end 8 of the transducer element 5 freely moves with respect to the support 4 and can be deflected along the reciprocation axis H. In so doing, the transducer element 5 is bent along its length, which elongates in the direction L in FIGS. 1 and 2.

Figure 6:
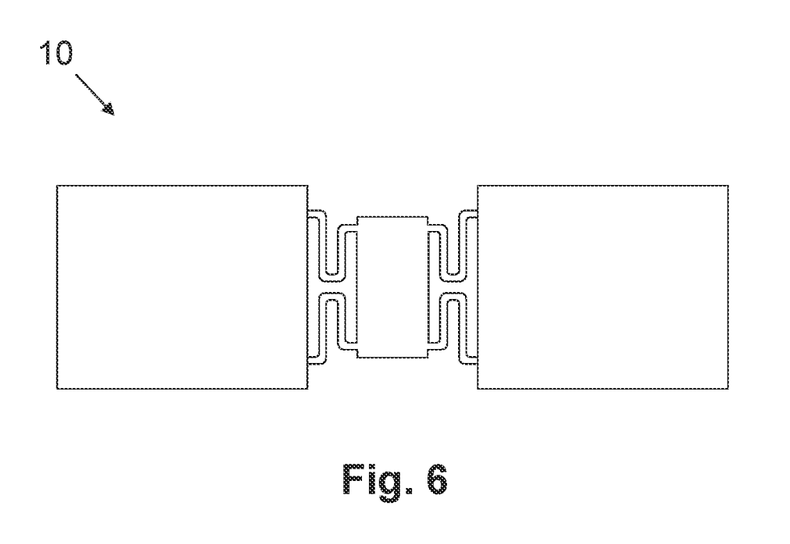
FIG. 6 schematically shows a support layer if removed from a multi-layer structure and viewed in a plan view as in FIG. 2.

In the present exemplary embodiment, the transducer element 5 is formed as an integral part of a multilayer structure 9. As schematically shown in FIG. 1, the multilayer structure 9 includes at least one support layer 10 and one transducer layer 11. FIG. 6 schematically shows the support layer 10 in a plan view from the side connected to the support 4. Preferably, the transducer layer 11 is formed as a piezoelectric transducer layer 11. Additionally, the multilayer structure 9 can include further layers (not shown here), such as, for example, electron layers and/or insulation layers.

As is apparent from FIGS. 1 and 2, the support 4 is disposed so that the diaphragm 3 is spaced apart from the transducer element 5 in the direction of the reciprocation axis H, and so a support cavity 12 is formed between the diaphragm 3 and the transducer element 5. The support cavity 12 therefore forms a portion of the acoustic cavity 7 of the MEMS sound transducer 1. Moreover, in order to couple the diaphragm 3 to the transducer element 5, the transducer unit 2 includes a coupling element 13. The coupling element 13 extends from the diaphragm 3 up to the transducer element 5 in the direction of the reciprocation axis H. Preferably, the coupling element 13 is directly and/or rigidly connected to the diaphragm 3. The diaphragm 3 and the coupling element 13 therefore jointly oscillate as a unit along the reciprocation axis H.

Figure 4:
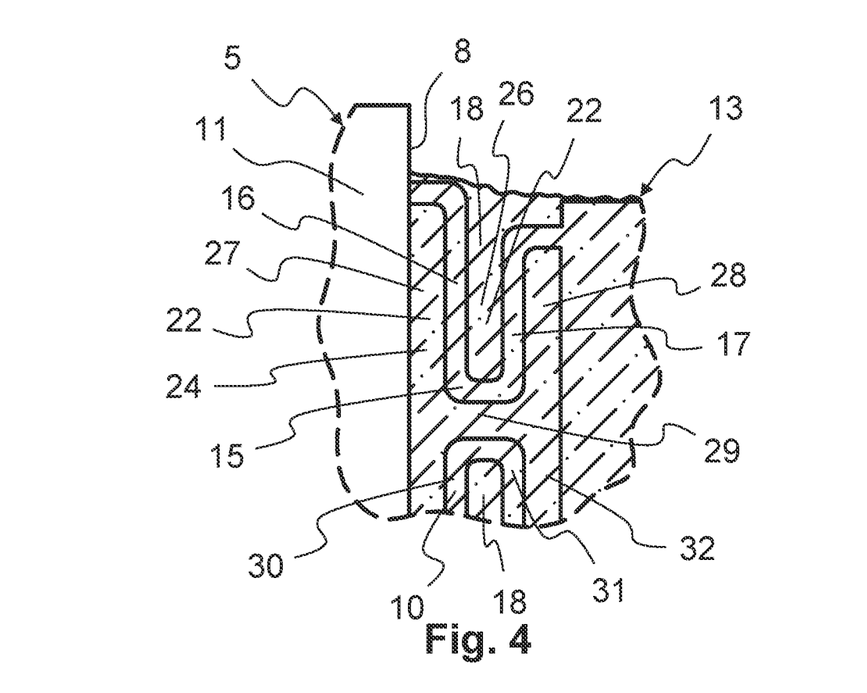
FIG. 4 shows an enlarged view of a portion of the top view of the MEMS sound transducer in the area of the spring region of FIG. 2, and FIG. 5 schematically shows a method sequence using cross-sectional representations for manufacturing a damping layer of a transducer unit of the MEMS sound transducer.

Moreover, the transducer unit 2 has a spring region 14 schematically shown in FIG. 1 and FIG. 2 partially in an enlarged view in FIG. 4. The function of the spring region 14 is to be able to compensate for changes in orientation between the coupling element 13 and the transducer element 5, in particular the free end 8 of the transducer element 5. The spring region 14 is formed between the transducer element 5 and the coupling element 13. The transducer element 5 is therefore indirectly connected to the coupling element 13 via the spring region 14. For this purpose, as schematically shown in FIG. 4, the spring region 14 includes at least one first spring element 15. This at least one first spring element 15 therefore movably connects the transducer element 5 to the coupling element 13.

Figure 3:
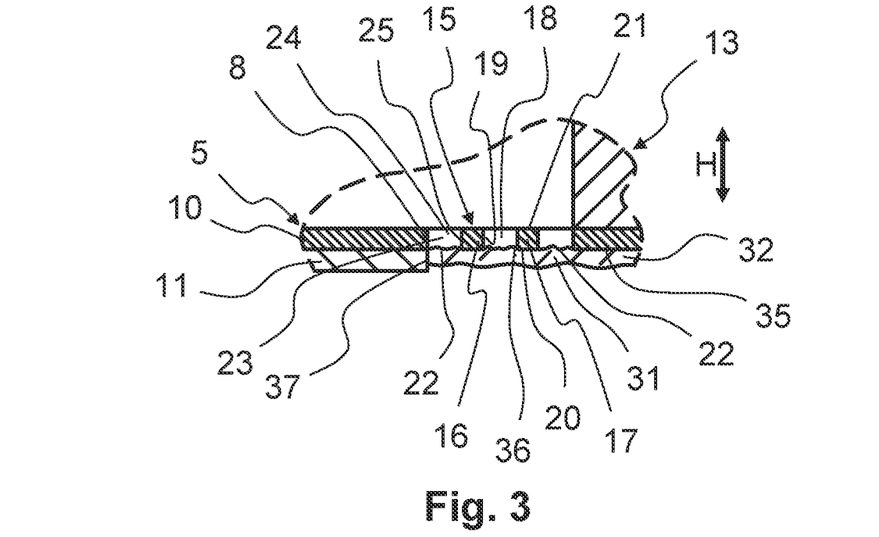
FIG. 3 shows an enlarged view of a portion of the lateral sectional view of the MEMS sound transducer in the area of a spring region of FIG. 1.

As is apparent, in particular, from the detailed sections shown in FIGS. 3 and 4, the first spring element 15 can have a meandering shape. In the present case, the first spring element 15 is shaped in such a way that the first spring element 15 has two spring element sections 16, 17 positioned opposite each other.

The spring region 14 includes a first recess 18, which is schematically shown in FIG. 3 and determines a contour of the first spring element 15. The first recess 18 cuts free a first longitudinal side 19 of the first spring element 15. For this purpose, the first recess 18 extends from the free end 8 to the coupling element 13 in the longitudinal direction L schematically shown in FIGS. 1 and 2 of the transducer element 5.

The spring region 14 includes, according to FIG. 3, a first side 20 and an opposite, second side 21 in the direction of the reciprocation axis H. The first side 20 faces away from the diaphragm 3 and the opposite, second side 21 faces the diaphragm 3. The first recess 18 is designed to be continuous. Consequently, the first recess 18 extends continuously from the first side 20 up to the second side 21 in the direction of the reciprocation axis H. The first recess 18 therefore has a recess opening 22 both at the first side 20 and at the second side 21, of which only one recess opening 22 is provided with a reference character in FIG. 3 for reasons of clarity. An inner region 23 of the first recess 18 is therefore formed between the two recess openings 22.

As is apparent, in particular, from FIG. 4, the spring region 14 includes a second recess 24. The second recess 24 is designed similarly to the first recess 18, according to the preceding description. The second recess 24 cuts free a second longitudinal side 25 of the first spring element 15. The first spring element 15 is therefore located, in a top view, between the two recesses 18, 24. The contour of the first spring element 15 is therefore determined by the two adjacent recesses 18, 24.

In the present exemplary embodiment, the transducer unit 2 according to FIGS. 2 and 4 includes, in addition to the first spring element 15, a second spring element 30, which connects the transducer element 5 to the coupling element 13. The second spring element 30 can be designed similarly to the first spring element 15 according to the preceding description. In the present exemplary embodiment, the two spring elements 15, 30 are merely mirror images of each other.

According to FIG. 4, the first recess 18 has a first section 26, which is formed between the two opposite spring element sections 16, 17 of the first spring element 15. The second recess 24 has a second section 27, which is formed between the first spring element 15, in particular the first spring element section 16, and the transducer element 5. The second recess 24 also has a third section 28, which is formed between the first spring element, in particular the second spring element section 17, and the coupling element 13. Moreover, the second recess 24 has a fourth section 29, which is formed between the first spring element 15 and the second spring element 30, which is adjacent to the first spring element 15. The second recess 24 is therefore associated with both the first spring element 15 and the second spring element 30.

The at least one spring element 15, 30 must be highly filigreed in order to be able to ensure an optimal movement of the coupling element 13 and of the transducer element 5. Thus, each spring element 15, 30 is configured as a small, thin, wiry structure that is rendered fragile in accordance with relatively low, natural mechanical resonance frequencies that characterize such highly filigreed elements. However, it is disadvantageous if the at least one spring element 15, 30 should break during mechanical vibrations, which, in turn, results in the failure of the transducer unit 2 and of the entire MEMS sound transducer 1. The transducer unit 2 therefore includes a damping layer 31 that is disposed in the spring region 14 of the transducer unit 2 for the protection of the at least one spring element 15, 30. The damping layer 31 is arranged on and/or across the at least one spring element 15, 30. The damping layer 31 reduces the amount of vibration, i.e., the maximum induced elongation as well as the duration of the loading that acts on the at least one spring element 15, 30 during a mechanical shock. As a result, a breakage of the at least one spring element 15, 30 can be prevented.

The damping layer 31 at least partially covers the at least one spring element 15, 30. In the present exemplary embodiment, the damping layer 31 covers one side of the spring element 15, 30 completely and/or across the entire length of the spring element 15, 30. As is apparent from FIGS. 1 and 3, the damping layer 31 is applied on the first side 20 of the spring region 14. Alternatively or additionally, the damping layer 31 could also be applied on the second side 21 of the spring region 14, however.

The damping layer 31 is arranged in the spring region 14 not only across the at least one spring element 15, 30, but rather additionally also at least partially across the at least one recess 18, 24 of the spring region 14. As a result, the at least one spring element 15, 30 is additionally supported, damped, and/or stabilized.

Figure 5:
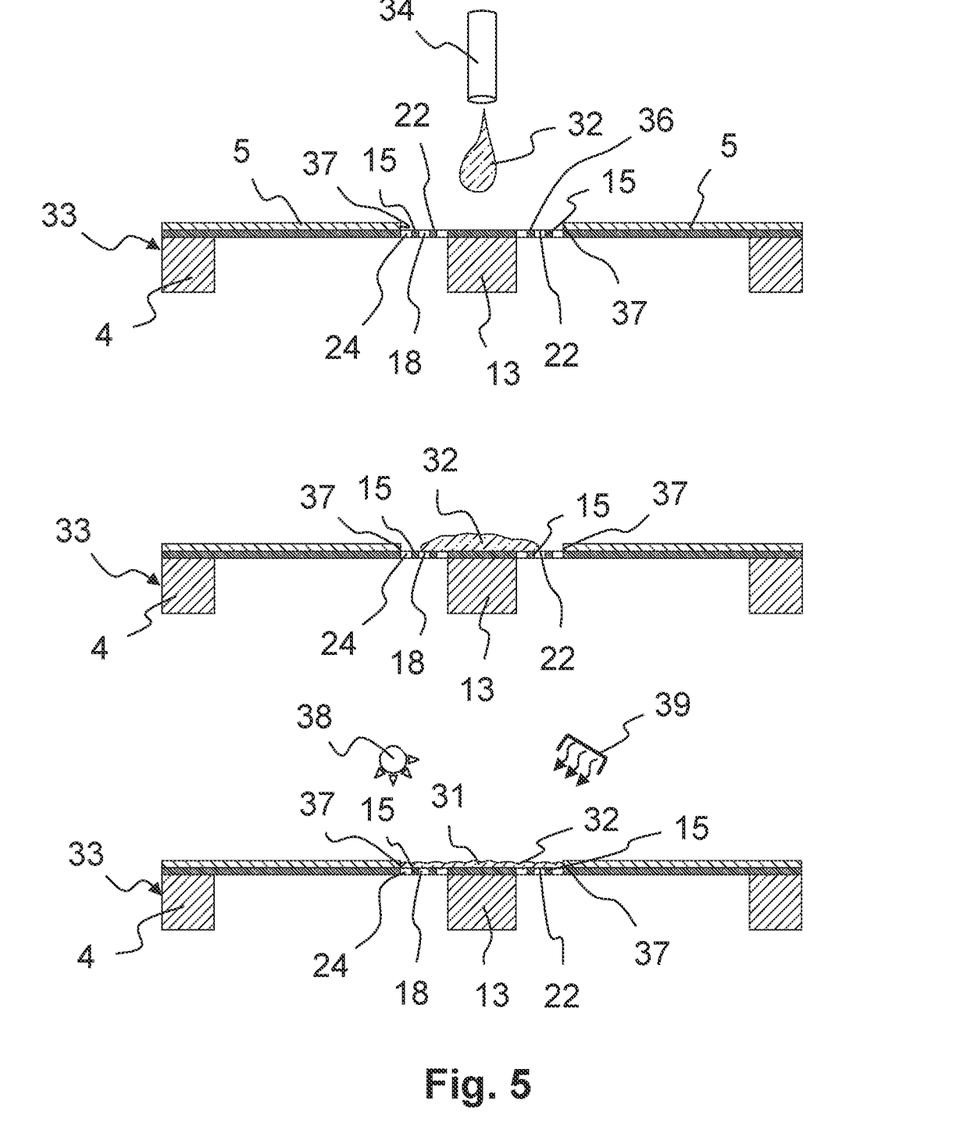

The damping layer 31 is formed from a cured adhesive 32, which is schematically represented by the evenly spaced apart, diagonally extending plurality of chain-dashed straight lines in FIGS. 2, 4 and 5. In the cured condition, this adhesive 32 is elastic, and so the adhesive 32 will essentially not negatively affect the mobility of the at least one spring element 15, 30. For this reason, moreover, it is advantageous when the adhesive 32 is thixotropic. This means, the viscosity of the adhesive 32 decreases during continuous deformation. Consequently, the resistance that the damping layer 31 brings against the at least one spring element 15, 30 decreases when the transducer unit 2 is active. It is also advantageous when the adhesive 32 is solventless, and so the at least one spring element 15, 30, which is preferably formed from the support layer 10 of the multilayer structure 9, is not attacked by solvents in the adhesive 32.

FIG. 5 shows a schematic representation of a manufacturing method for forming the damping layer 31 on the spring region 14. At this point in time of the manufacturing method, the diaphragm 3 is preferably not yet arranged at the support 4. FIG. 5 shows a semi-finished product of the transducer unit 2. In order to manufacture the semi-finished product 33 shown in FIG. 5, multiple layers, in particular at least the support layer 10, the transducer layer 11, and/or electron layers, were previously applied on a support substrate, in particular a silicon substrate. Thereafter, the support substrate was at least partially etched away in an etching process in order to form the support cavity 12, which is shown in FIG. 1. Within the scope of this etching process, the applied layers were also etched away in regions and/or partially, in order to form the multilayer structure 9, by means of which, in turn, the at least one transducer element 5 and the at least one spring element 15, 30 were formed. Consequently, as schematically shown in FIG. 6 for example, the at least one recess 18, 24 of the spring region 14 was formed by the etching away, in areas, of the support layer 10.

After the formation of the semi-finished product 33, according to FIG. 5, the liquid adhesive 32 is applied onto the spring region 14 for forming the damping layer 31. This is carried out, according to the exemplary embodiment shown in FIG. 5, on the first side 20 of the spring region 14 and/or from above in order to utilize gravity. The application is carried out by means of an application device 34. The application device 34 is formed, in the present case, as an injection needle. Consequently, the liquid adhesive 32 is applied as a drop, in particular as a single drop. In one exemplary embodiment that is not shown here, the liquid adhesive 32 could also be applied as a line, however.

The coupling element 13 is arranged in a center of the transducer unit 2. Due to this fact, the liquid adhesive 32 is injected, according to FIG. 5, onto an end face 35 (FIG. 3) of the coupling element 13. From there, the liquid adhesive 32 spreads, in particular due to gravity, laterally in the direction of the at least one adjoining spring region 14. Thus, the liquid adhesive 32 covers an outer side 36 of the at least one spring element 15, 30. The liquid adhesive 32 has a viscosity of 5000 mPa*s to 15000 mPa*s, in particular of 10000 mPa*s. Moreover, a width of the at least one recess 18, 24 is designed to be so small and corresponding to the viscosity of the liquid adhesive 32 so that the liquid adhesive 32 essentially cannot penetrate at least one section 26, 27, 28, 29 of the at least one recess 18, 24. Consequently, the liquid adhesive 32 also flows across this at least one recess 18, 24. The liquid adhesive 32 therefore spans and/or covers the corresponding recess opening 22 of the at least one recess 18, 24. Consequently, the inner region 23 of the at least one recess 18, 24 remains adhesive-free. The liquid adhesive 32 therefore cannot drip through the slots formed by the at least one recess 18, 24.

According to FIG. 5, the liquid adhesive 32 therefore spreads uniformly across the end face 35 of the coupling element 13 and of the at least one spring region 14. As is apparent in particular from FIGS. 3 and 5, the free end 8 of the transducer element 5 is higher than the adjacent spring region 14 in the direction of the reciprocation axis H, and so a shoulder 37 is formed between these two. This shoulder 37 laterally delimits the space provided for the damping layer 31, in which space the liquid adhesive 32 can spread. The amount of the liquid adhesive 32 is metered in such a way that the liquid adhesive 32 does not run over the shoulder 37. After the adhesive 32 has cured, the damping layer 31 therefore rests against this shoulder 37.

Once the liquid adhesive 32 has spread out uniformly on the first side 20 in the at least one spring region 14, the liquid adhesive 32 is cured. This is carried out by means of light, in particular UV and/or VIS, and/or by means of heat. Consequently, the liquid adhesive 32 is irradiated by a light source 38 and/or the surroundings are heated via a heat source 39.

Thereafter, the diaphragm 3 is mounted at the transducer unit 2, and so the MEMS sound transducer 1 is formed.

The present invention is not limited to the embodiments shown and described. Variations within the scope of the patent claims are possible, as is a combination of the features, even if these are shown and described in different exemplary embodiments.

LIST OF REFERENCE NUMERALS

1 MEMS sound transducer
2 transducer unit
3 diaphragm
4 support
5 transducer element
6 base
7 cavity
8 free end
9 multilayer structure
10 support layer
11 transducer layer
12 support cavity
13 coupling element
14 spring region
15 first spring element
16 first spring element section
17 second spring element section
18 first recess
19 first longitudinal side
20 first side of the spring region
21 second side of the spring region
22 recess opening
23 inner region of the recess
24 second recess
25 second longitudinal side
26 first section
27 second section
28 third section
29 fourth section
30 second spring element
31 damping layer
32 adhesive
33 semi-finished product
34 application device
35 end face
36 outer side
37 shoulder
38 light source
39 heat source
H reciprocation axis

What is claimed is:

1. A transducer unit configured for a MEMS sound transducer, wherein the MEMS sound transducer includes a diaphragm, the transducer unit comprising:
   a support,
   a first transducer element, which is connected to the support and is configured to be deflectable in a direction along a reciprocation axis,
   a coupling element configured for connecting the first transducer element to the diaphragm in a manner that leaves the diaphragm spaced apart from the first transducer element in the direction of the reciprocation axis, wherein the coupling element is movable in the direction along the reciprocation axis, and
   a spring region formed between the first transducer element and the coupling element, the spring region including a first spring element, which elastically connects the transducer element to the coupling element, and wherein the spring region includes a damping layer, which at least partially covers the first spring element,
   wherein the damping layer is made of a cured adhesive.

2. The transducer unit of claim 1, wherein the cured adhesive is elastic and has an elasticity modulus of less than 10 MPa.

3. The transducer unit of claim 1, wherein the cured adhesive is thixotropic.

4. The transducer unit of claim 1, wherein the cured adhesive has a density from 0.5 $g/cm^3$ to 1.5 $g/cm^3$.

5. The transducer unit of claim 1, wherein the first spring region defines a first longitudinal side spaced apart from a second longitudinal side, wherein the spring region defines a recess that is disposed to free the first longitudinal side of the first spring element, and wherein the damping layer at least partially covers and spans the recess.

6. The transducer unit of claim 1, wherein the spring region defines a first side and a second side, which is disposed opposite the first side, wherein the damping layer is arranged on at least one of the first side and the second side of the spring region.

7. The transducer unit of claim 4, wherein the recess defines a recess opening, wherein the damping layer is arranged, in the direction of the reciprocation axis, in the region of the recess opening of the recess and spans the recess opening, wherein the recess defines an inner region adjoining the recess opening and that remains adhesive-free.

8. The transducer unit of claim 4, wherein the spring element includes a first spring element section and a second spring element section disposed opposite the first spring element section, wherein the recess defines a first recess section, which is disposed between the first spring element section and the second spring element section, wherein the recess defines a second recess section, which is disposed between the spring element and the first transducer element, wherein the recess defines a third section, which is disposed between the spring element and the coupling element.

9. The transducer unit of claim 1, wherein the coupling element defines an end face adjoining the spring region, wherein the damping layer at least partially covers the end face of the coupling element adjoining the spring region.

10. The transducer unit of claim 1, wherein the first transducer element defines one free end that projects above the spring region in the direction of the reciprocation axis to form a shoulder, and the damping layer rests against the shoulder.

11. A MEMS sound transducer for generating and/or detecting sound waves, the MEMS sound transducer including:
- a diaphragm, which is deflectable along a reciprocation axis;
- a transducer unit having a support, a transducer element, which is connected to the support, is spaced apart from the diaphragm and deflectable along the reciprocation axis;
- a coupling element, which connects the transducer element to the spaced-apart diaphragm and is movable together with the diaphragm along the reciprocation axis; and
- at least one spring region formed between the transducer element and the coupling element, the at least one spring region including at least one spring element, which movably connects the transducer element to the coupling element, and which has a damping layer, which at least partially covers the spring element, wherein the damping layer is made of a cured adhesive.

12. The transducer unit of claim 1, wherein the cured adhesive is thixotropic has a viscosity that decreases as a result of continuous deformation.

13. The transducer unit of claim 1, wherein the cured adhesive is thixotropic has a viscosity that decreases as a result of continuous deformation.

14. The transducer unit of claim 1, wherein the cured adhesive has a density from 0.5 g/cm$^3$ to 1.5 g/cm$^3$ and is non-soluble.

15. The transducer unit of claim 7, further comprising a second spring element, wherein the first recess defines a fourth recess section disposed between the first spring element and the second spring element.

* * * * *